United States Patent
Cha et al.

(10) Patent No.: US 7,978,436 B2
(45) Date of Patent: Jul. 12, 2011

(54) AIR BEARING SURFACE WITH HIGHER FLYING HEIGHT FOR LOWER ROTATING SPEED DRIVES

(75) Inventors: Ellis T. Cha, San Ramon, CA (US); Zhu Feng, Pleasanton, CA (US); Xinjiang Shen, Fremont, CA (US); Sindy Yeung, Fremont, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 832 days.

(21) Appl. No.: 11/758,603

(22) Filed: Jun. 5, 2007

(65) Prior Publication Data
US 2008/0304181 A1    Dec. 11, 2008

(51) Int. Cl.
*G11B 5/60* (2006.01)
*G11B 21/21* (2006.01)
*G11B 17/32* (2006.01)
(52) U.S. Cl. .................. 360/236.2; 360/236.3
(58) Field of Classification Search ........ 360/235.4–237
See application file for complete search history.

(56) References Cited

U.S. PATENT DOCUMENTS

| | | | | |
|---|---|---|---|---|
| 5,583,722 A * | 12/1996 | Dorius et al. | ............... | 360/236.3 |
| 5,870,250 A * | 2/1999 | Bolasna et al. | ............ | 360/236.8 |
| 6,055,129 A * | 4/2000 | Park et al. | .................. | 360/236.1 |
| 6,477,012 B1 | 11/2002 | Park et al. | | |
| 7,061,721 B2 | 6/2006 | Nakakita et al. | | |
| 7,446,970 B2 * | 11/2008 | Nakajima et al. | ............... | 360/75 |
| 7,583,473 B2 * | 9/2009 | Bolasna et al. | ............ | 360/236.2 |
| 7,751,147 B2 * | 7/2010 | Dorius et al. | ............. | 360/235.8 |
| 2007/0153422 A1 * | 7/2007 | Kang et al. | .................. | 360/235.4 |

OTHER PUBLICATIONS

Office Action—China Chinese Patent App. No. 200810131469.3 Mail date—Dec. 21, 2010, SAE Magnetics (H.K.) Ltd.

* cited by examiner

*Primary Examiner* — Craig A. Renner
*Assistant Examiner* — Adam B Dravininkas
(74) *Attorney, Agent, or Firm* — Saile Ackerman LLC; Stephen B. Ackerman

(57) ABSTRACT

A method and apparatus for improving flying height stability in a small form factor hard disk drive that typically moves at lower speeds is achieved by a slider having an ABS with an air channel and pocket. The air channel and pocket are configured to increase the amount of aerodynamic lift provided by normally smaller amounts of intake air at the inner diameter of the rotating disk and, thereby, to achieve a desired flying height profile.

7 Claims, 4 Drawing Sheets

FIG. 1 - Prior Art

AIR BEARING SURFACE WITH HIGHER FLYING HEIGHT FOR LOWER ROTATING SPEED DRIVES

FIELD OF THE INVENTION

The present invention relates to hard disk drives. In particular, the present invention relates to an improved design for an air bearing slider.

BACKGROUND

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk's data tracks. The high speed rotation of a magnetic disk generates a stream of air flow along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing. The ABS of a slider is generally configured on the slider surface facing the rotating disk, and greatly influences its ability to fly over the disk under various conditions.

As portable devices such as handheld music/video players, cell phones, and digital cameras have become more prevalent, the market for small form factor (0.85" to 1.8") hard disk drives (SFF HDD) has increased substantially. SFF HDDs offer high recording capacity at a relatively inexpensive price. One design requirement critical for good reliability in SFF HDDs is a stable gap or flying height (FH) between the magnetic head (embedded in the slider) and the media (disk) in all possible environments where consumer electronics might be used.

The design of SFF HDDs presents many unique challenges. One such challenge is achieving a high enough flying height at very low linear speeds. The air bearing is generated by the air flow created by the rotation of the magnetic disk under the slider. A larger relative speed (i.e. a faster spinning disk or a disk with a larger radius) makes it easier to lift an air bearing. A typical speed at the inner diameter ("ID") for a 3.5" HDD like the ones used in desktop computers is approximately 18 m/s; while for a 0.85" disk drive the speed at the ID is only approximately 2 m/s. This much lower speed makes it very difficult to generate enough air bearing force to fly the slider at a height that can avoid disk contact at the inner radius of a disk.

A related issue is the challenge of achieving a uniform flying height across the radii of the disk. The linear velocity of the disk increases at larger radii, making it more difficult to achieve a uniform flying height. In a typical 3.5" HDD the sliders can be designed to reach a saturation level where the slider will continue to fly at a relatively constant height across varying radii (i.e. at varying linear velocities). Low linear velocities makes achieving a constant flying height across the radii of SFF HDDs more challenging.

Another challenge in designing SFF HDDs is large disk clamp distortion at the ID. SFF HDDs require thin disks, but thin disks usually have large distortions caused by disk clamping forces, leading to undulated disk surfaces and large FH variations at different radii. Disk distortion is typically more pronounced at the ID than at the OD.

In addition to the challenges mentioned above, there are many unique challenges presented by specific requirements of the consumer electronic devices that utilize SFF HDDs. For example, consumer electronics devices must operate in a large temperature range (from −20° C. to 80° C.). At varying temperatures, the slider and other disk drive components can experience thermal contraction or expansion. In order to achieve a stable flying height, an ABS design must compensate for the physical distortions that different temperatures can cause.

In addition to operating at a range of temperatures, consumer electronics and the SFF HDDs inside them must also be able to operate at different altitudes, ranging anywhere from below sea level to twenty thousand feet above sea level. The lower air density at high altitudes relative to sea level makes achieving an adequate lift force, and thus a stable flying height, more difficult.

Consumer electronics devices also have stringent shock requirements. The types of devices utilizing SFF HDDs frequently operate while moving and thus need to be able to withstand sudden impacts. A mechanical shock, such as being dropped to the ground, can cause the flying height between the magnetic head and the disk to suddenly change or even drop to zero, leading to head-disk contact. Therefore, an ABS design should be able to prevent head-disk contact under a certain level of shock.

In light of the foregoing challenges, a need in the art exists for an improved ABS design for use in SFF HDDs.

DETAILED DESCRIPTION

Figure 1:
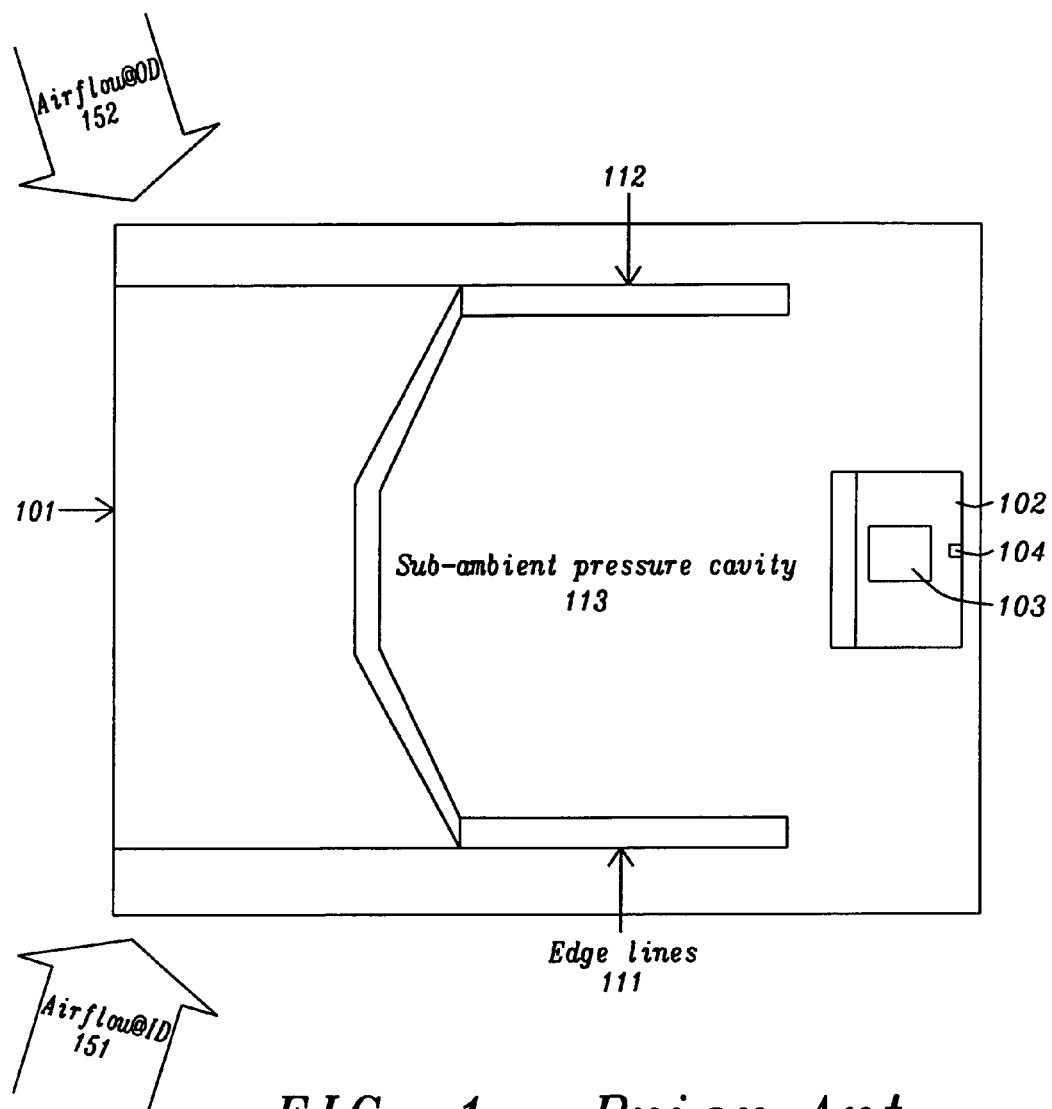
FIG. 1 shows an ABS design as known in the art.

FIG. 1 shows a typical design of an ABS for achieving a uniform flying height in a typical 3.5" drive. The ABS has a leading edge 101 and a trailing edge 102, with a center pad 103 and read/write element 104 at the trailing edge 102. At the inner radius, the air flow generally comes from the direction shown by the arrows 151. At the outer radius, the air flow generally comes from the direction of the arrows 152. The ABS utilizes two edge lines 111 and 112 to form a sub-ambient pressure cavity 113 that provides the lift force for the ABS. At the ID, edge line 111 is at the air influx side of the ABS. The height and length of edge line 111 can be modified to determine the amount of air that is blocked and the amount of air that is allowed to enter the sub-ambient pressure cavity 113 when the ABS is at the ID.

At the OD, edge line 112 is at the air influx side of ABS, and likewise the height and length of edge line 112 can be selected to determine the amount of air that is blocked and the amount of air that is allowed to enter the sub-ambient pressure cavity 113. In a typical drive, the amount of incoming airflow at the OD will be significantly greater than the amount of airflow at the ID. Therefore, in order to achieve a constant flying height, the edge lines 111 and 112 will typically be configured to block more air at the OD than at the ID, and consequently to allow more air to enter the sub-ambient pressure cavity 113 at the ID than at the OD.

Figure 2:
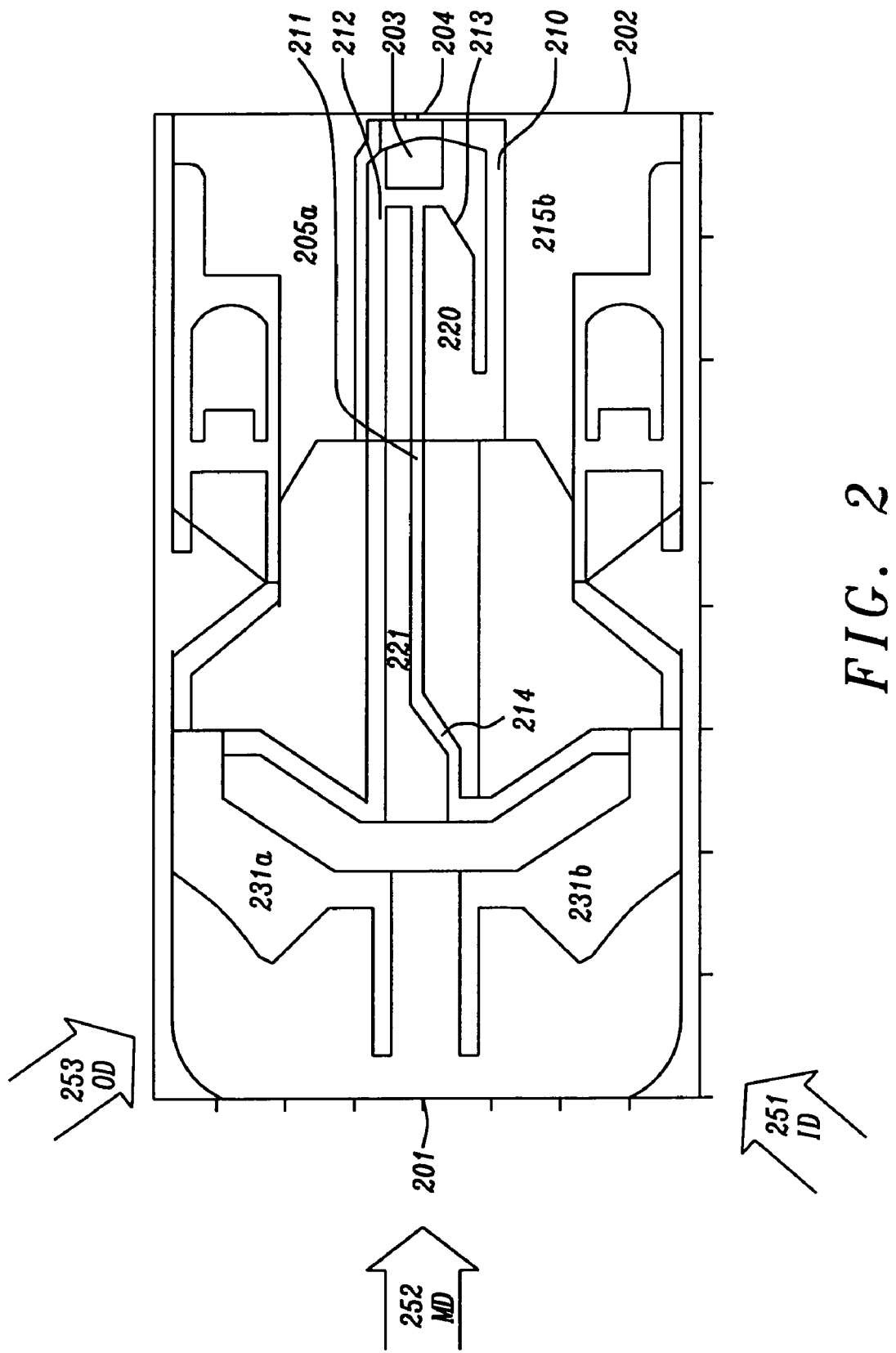
FIG. 2 shows an ABS design with a central air tunnel and pocket apparatus for achieving a higher flying height at low linear velocities and a relatively constant flying height across varying radii.

The design of FIG. 1 works well for high speed 3.5" disk drives; however, for SFF HDDs a more complex design is needed to achieve a desirable flying height profile. FIG. 2 shows an ABS embodying aspects of the present invention. Like the design shown in FIG. 1, the embodiment shown in FIG. 2 contains a leading edge 201, a trailing edge 202, and a center pad 203, with a read/write element 204 at the trailing edge 202. The ABS can also has two sub-ambient pressure cavities 205a and 205b as well as side pads 231a and 231b which also produce a lifting force.

An aspect of the present invention calls for using ABS rails (such as 210, 211, and 212) to create a central air channel 221 and pocket apparatus 220. The height, width, angles, spacing, and other characteristics of the rails can be altered to change the pressure, and as a result the lifting force, created by the central air channel 221 and the pocket 220. In a typical embodiment, the air channel 221 and pocket 220 can be designed to provide a lift force at the trailing edge 202 of the ABS.

In a typical ABS embodying aspects of the present invention, as the ABS moves from the ID to the MD to the OD and the air flow increases, the lifting force created by air going into the pocket 220 and into the air channel 221 may reduce. The increased airflow, however, may cause the lifting force at sub-ambient pressure cavities 205a and 205b and side pads 231a and 231b to increase in a manner that offsets the lower lifting force at the pocket 220 and air channel 221. Having multiple apparatuses that can independently alter the lift force of the ABS based on its orientation and linear velocity can make it possible for a designer to achieve a desired flying height profile across the varying radii of a disk. For example, even in spite of the substantially lower linear velocity at the ID, aspects of the present invention make it possible to configure an ABS to result in a higher flying height at the ID than at the OD. A configuration that results in a higher flying height at the ID might be desirable in order to avoid certain types of disk failure which occur disproportionately at the ID.

At the inner radius, the air flow generally comes from the direction shown by the arrows 251. Rails 210 and 211 and a trapper 213 form a pocket 220, which acts as an air-pressurized chamber to lift the trailing edge 202. The length and height of rail 210, as well as the separation between rails 210 and 211 and the angle and height of the trapper 213 can all be adjusted to create a desired lifting force, and as a result, a desired flying height. At the ID, air flow 251 is typically at its lowest, meaning the air pocket 220 needs to be configured to trap more air at the ID than at other radii on the disk by toward to the air flow direction at ID.

At the middle radius, the air flow generally comes from the direction of the arrows 252. Rails 211 and 212 form a central air channel 221. The opening of the central air channel 221 has a partial deflector 214. The height, length, and deflect angle of the partial deflector 214 as well as the separation of rails 211 and 212 can be varied to increase or decrease the amount of air entering the air channel 221, and as result the lifting force of the channel 221.

At the outer radius, the air flow generally comes from the direction of the arrows 253 and is greater than at other radii on the disk. With the greater lift force created by the increased airflow at the OD, the ABS may be configured to direct less air into the channel 221 and pocket 220. This can be achieved by configuring rail 212 to block air flow. The decrease in lift force created by the channel 221 and pocket 220 can be offset by the increased lift force at sub-ambient pressure cavities 205a and 205b and side pads 231a and 231b, resulting in a desired flying height profile.

Figure 3:
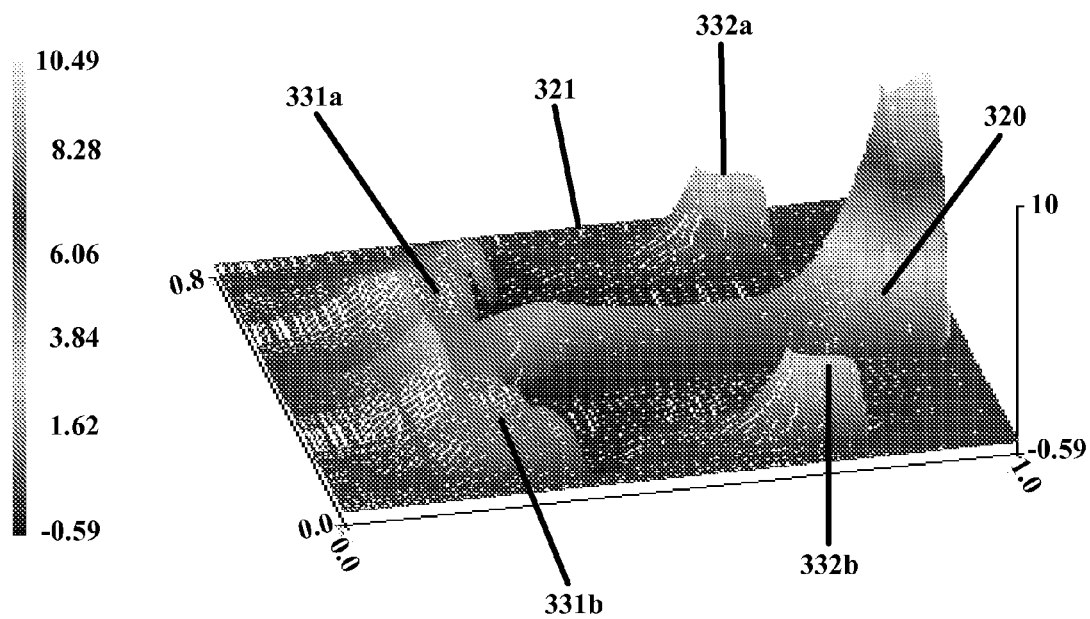
FIG. 3 shows the air pressure profile at sea level for an ABS embodying aspects of embodiments the present invention.

FIG. 3 shows an air pressure profile at the ID for an ABS embodying aspects of embodiments of the present invention. In addition to the lift force created by the side pads 231a-b and 232a-b (shown at 331a-b and 332a-b on the pressure profile), the air tunnel 221 and pocket 220 create a relatively large additional lift force (shown at 321 and 320 on the pressure profile). The lift force is greatest at the trailing edge 202 (302 on the pressure profile) where the read/write element is located. As the ABS moves from the ID to the OD, the lift forces at the tunnel 221 and pocket will decrease and the lifts forces at the side pads 231a-b and 232a-b will increase in a manner that will achieve a desired flying profile.

Figure 4:
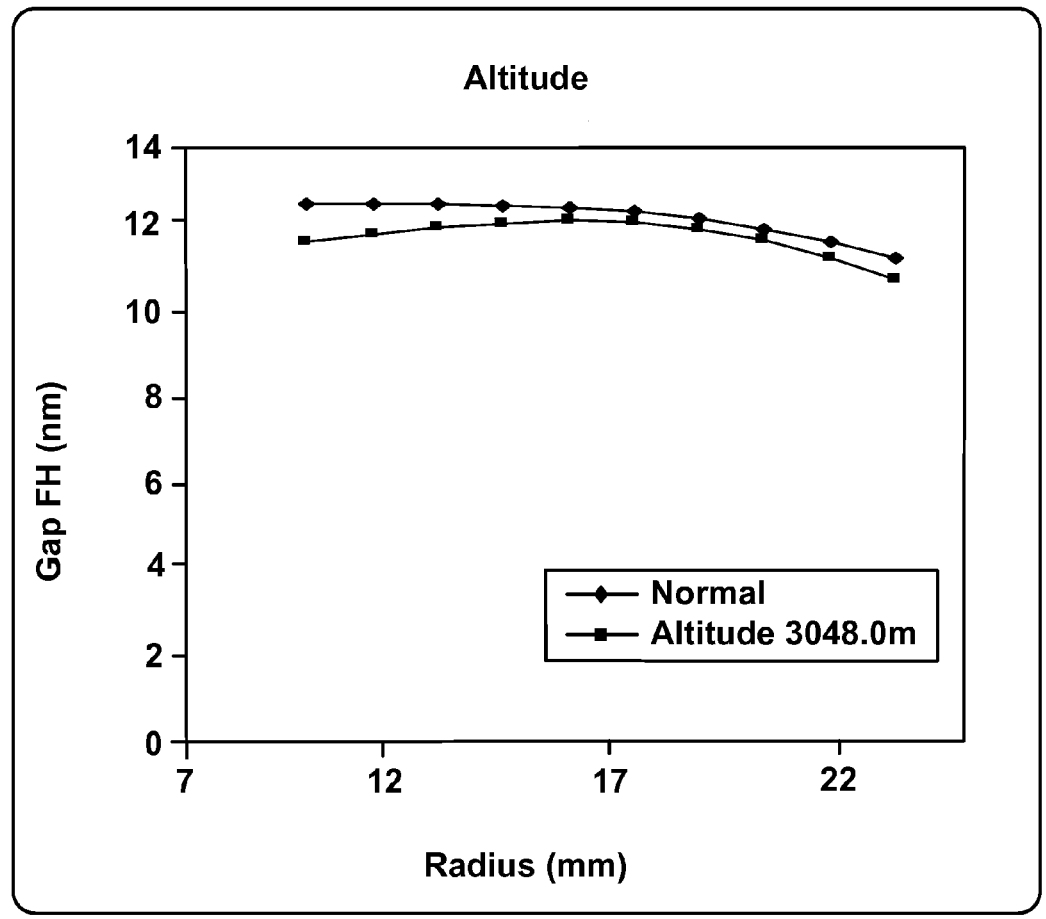
FIG. 4 shows the flying height profile at sea level and ten-thousand feet for an ABS embodying aspects of embodiments of the present invention.

FIG. 4 shows the flying height of an ABS with a central air tunnel and pocket apparatus according to embodiments of the present invention. At 10K as well as at sea level, the flying height at the ID is higher than that at the OD, which will dramatically improve the reliability of small platform drives.

The previous description of embodiments is provided to enable a person skilled in the art to make and use the present invention. Various modifications to these embodiments will be readily apparent to those skilled in the art, and the generic principles and specific examples defined herein may be applied to other embodiments without the use of inventive faculty. For example, some or all of the features of the different embodiments discussed above may be deleted from the embodiment. Therefore, the present invention is not intended to be limited to the embodiments described herein but is to be accorded the widest scope defined only by the claims below and equivalents thereof.

What is claimed is:

1. A slider for use in a disk drive comprising:
   an air bearing surface;
   an air channel and a pocket formed in said air bearing surface and laterally disposed to either side of a first long rail, wherein said first long rail contacts a center pad leading edge and runs medially therefrom in a direction from said center pad leading edge towards a leading edge of said slider forming a common boundary of said air channel and said pocket, whereby said air channel is isolated from said pocket; wherein
   said pocket is closed at said leading edge of said center pad by an angled trapper connecting said first long rail to a short rail, that is shorter than said first long rail and is parallel to said first long rail and contacts said center pad and wherein
   said air channel is formed by said first long rail and a second long rail, also originating at said leading edge of said center pad and of substantially equal length as said first long rail and parallel to said first long rail on an opposite side of said first long rail as said short rail, whereby said channel is closed by said leading edge of said center pad and wherein
   said air channel has an asymmetric opening facing said leading edge of said slider wherein said asymmetry is caused by a partial deflector formed in said first long rail of said air channel boundary wherein said partial deflector makes a deflect angle with respect to said first long rail by bending away from said second long rail, whereby a variation of direction and amount of airflow into said closed air channel and into said closed pocket provides a controllable aerodynamic lift force on said air bearing surface.

2. The slider of claim 1, wherein said air channel and said pocket are surrounded laterally by sub-ambient pressure cavities that provide additional aerodynamic lifting forces.

3. The slider of claim 1 wherein an end of said first long rail closest to said slider leading edge forms the partial deflector by bending away from said second long rail so that an opening of said channel is asymmetric and airflow entering said air bearing surface primarily from one lateral edge of said air bearing surface is preferentially channeled into said channel and into said pocket and whereby the slider achieves additional aerodynamic lift from that airflow.

4. The slider of claim 3, wherein said air channel is configured to produce a greater lift force where the airflow is directed tangent to said partial deflector than where the airflow is directed parallel to said channel or perpendicularly to said partial deflector.

5. The slider of claim 4 wherein said tangent direction of airflow occurs when said slider is at an inner diameter of a disk during disk drive operation.

6. The slider of claim 4 wherein said direction of airflow that is parallel to said channel occurs when said slider is at a middle diameter of a disk during disk drive operation.

7. The slider of claim 1 wherein said controllable lift force is appropriate for applications to disk drives having disks of diameter between 0.85" and 1.8" with smaller rotational speeds and correspondingly less aerodynamic lift.

* * * * *